No. 705,810. Patented July 29, 1902.
P. K. YOUNG.
HORSE HITCHER.
(Application filed Mar. 14, 1901.)
(No Model.)

WITNESSES:
R. J. Davenport.
M. Boekhoff.

INVENTOR
Philip K. Young,
PER, George W. Sues.
ATTORNEY.

UNITED STATES PATENT OFFICE.

PHILIP K. YOUNG, OF OMAHA, NEBRASKA.

HORSE-HITCHER.

SPECIFICATION forming part of Letters Patent No. 705,810, dated July 29, 1902.

Application filed March 14, 1901. Serial No. 51,140. (No model.)

*To all whom it may concern:*

Be it known that I, PHILIP K. YOUNG, residing at Omaha, in the county of Douglas and State of Nebraska, have invented certain useful Improvements in Horse-Hitchers; and I do hereby declare that the following is a full, clear, and exact description of the invention, such as will enable others skilled in the art to which it appertains to make and use the same, reference being had to the accompanying drawings, which form a part of this specification.

This invention has relation to a new and improved horse-hitcher.

The object of my invention is to provide a mechanical device so arranged that the same may be secured to a vehicle and being further adapted to receive a line or hitching-strap which is secured to the bits of the harness, as will be described more fully hereinafter.

Figure 1:
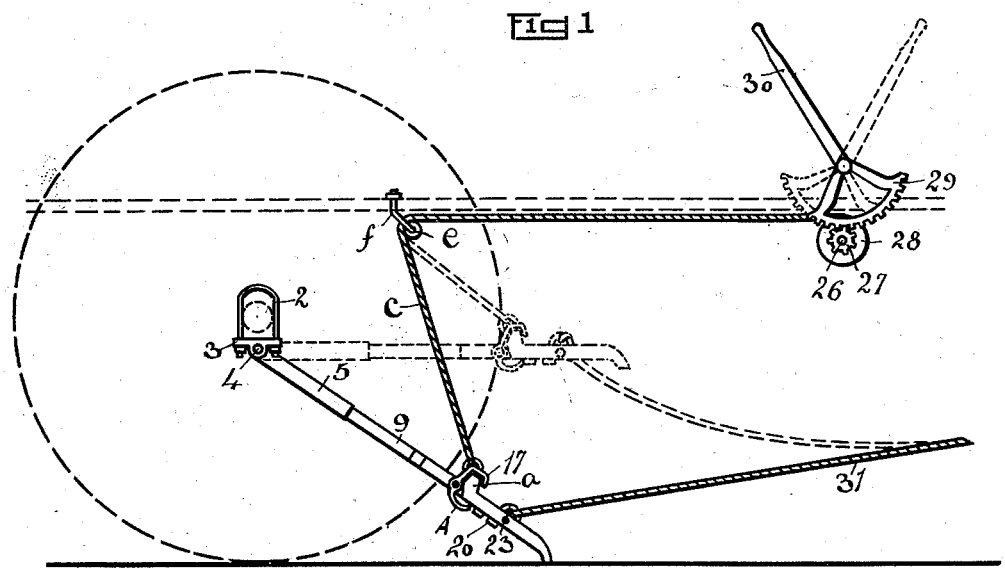
Figure 2:
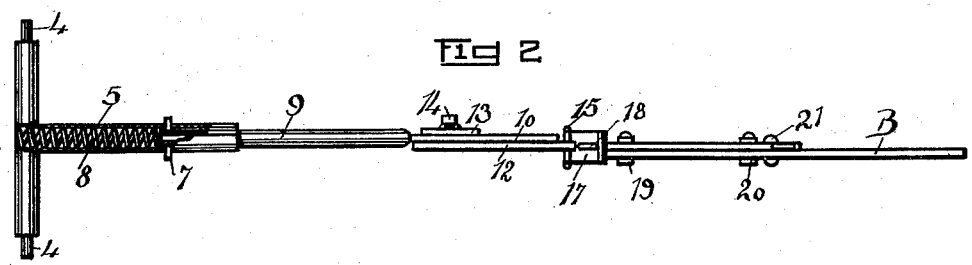
Figure 3:
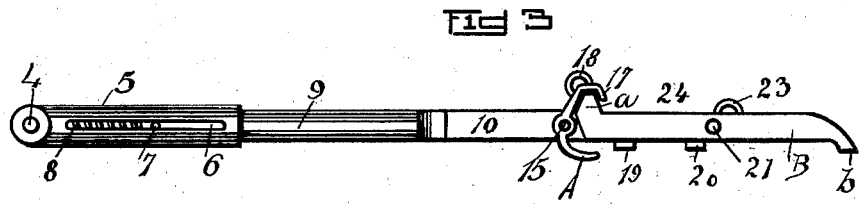
Figure 4:
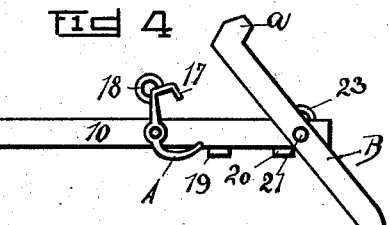

In the accompanying drawings I have shown in Figure 1 a side elevation disclosing a portion of a vehicle in dotted lines, disclosing the location of my horse-hitcher. Fig. 2 shows an enlarged detached detail with portions broken away of my horse-hitcher. Fig. 3 shows a side elevation of a horse-hitcher, while Fig. 4 shows an enlarged detached detail disclosing the forward tilting lever.

To the rear axle of a suitable vehicle I secure two bearings 3 3, which are held by means of suitable clips 2 2. Working within the bearings 3 is a bar 1, which bar has trunnions 4 4, which trunnions work within the bearings 3 and pivotally secure the bar 1 within the bearings. Extending from the bar 1 is a tube 5, which upon opposite sides is provided with the slots 6, as is shown more clearly in Fig. 3. Sliding within this tube 5 is a bar 9, having the projecting pin 7, which works through the slots 6, as is shown in Figs. 2 and 3. This pin prevents the bar 9 from revolving. To this bar 9 is secured a flat extension 10, as is shown in Fig. 2, and passing through a slot within this bar 10 is a screw 14, threading into the bar 12, which bar 12 by means of the screw 14 is adjustably secured to the end 10. This bar 12 is provided below with two stops 19 and 20 and is further provided with a supporting-pin 15, which pin holds a weighted keeper having an upper hooked end 17 and the depending weight A, as shown in Fig. 3. Passing through the bar 12 at its end is a bolt 21, which bolt pivotally holds a tilting lever B, provided with the upwardly-extending termination $a$ and the downwardly-extending lip $b$. This lever B freely moves upon the pivot 21 and is so positioned that the keeper 17 normally engages the end $a$ to lock this tilting lever B in alinement with the bar 12, as is shown in Fig. 3. The stops 19 and 20 prevent the tilting lever from working downward.

The bar 12 at a suitable point is provided with an ear 23, to which I secure a suitable hitching strand or strap 31, leading to the harness-bits.

Secured to an ear 13, fixed to the keeper 17, is a strand $c$, which strand works over a pulley $e$, which pulley is supported by means of the hanger $f$, as shown in Fig. 1. At a suitable point below the vehicle I provide a shaft 26, provided with a spool 28, upon which the strand $c$ winds. A sector 29 meshes with the pinion 27 and is provided with the lever 30. These instrumentalities are so arranged that when the lever is tilted the strand is wound or unwound upon the spool 28 to raise or lower the horse-hitcher.

Held within the tube 5 is a spring 8, so that the bar 9 is normally forced outward, this bar 9 and the members secured thereto being yieldingly pushed outward, as will be understood in referring to Fig. 2.

The operation of my device would be as follows: The horse-hitcher having been secured to a suitable vehicle drawn by one or two animals is so arranged that the hitching-strand 31 when the vehicle is at rest loosely hangs from the bits. The hitcher in the meantime has been permitted to drop down, so that the forward end of the tilted lever is in engagement with the ground. Now should the animals move forward the pivoted lever would remain at rest, while the animals would pass forward, which would result in the strand 31 drawing the animals back. Should the strain become too great upon the bits and the animals give a sharp jerk of the head, they would release the end of the tilting lever B, because the spring 8 would permit this yielding movement; but after being released this lever would again drop down to again engage the ground, which the horses would be able to again jerk out as the strain became too great, and in this manner the animals would find that in attempting to start they would be successively jerked back by a series of sharp positive tugs on their bits. It is not intended that this horse-hitcher shall stay in the ground long enough to permit the axle of the vehicle to which it is secured riding over the same, the object being to provide a hitching device so arranged that the horses will be continually jerked backward by means of sharp tugs at their bits as long as they move while this lever is in a pendent position.

As soon as it is desired to release the animals from the restraint of this horse-hitcher, it is simply necessary to draw up the line $c$, when the keeper 17 will release the lever B, so that the same will tilt downward, as is shown in Fig. 4, in which condition the end will readily ride over the ground and be inoperative.

When the device is not in use, it is preferably held in a horizontal position, as is shown in Fig. 1.

The device is simple of construction and readily operated, and

Having thus described my invention, what I claim as new, and desire to secure by United States Letters Patent, is—

1. The combination with a pivotally-supported holder, of a bar yieldingly held within said holder, a latch secured to said bar, and a trip held by said latch.

2. The combination in a device of the character described of a pivotally-supported holder, a bar yieldingly held within said holder a lever pivotally secured to the end of said bar and a keeper to lock said lever, as and for the purpose set forth.

3. In combination with a pivotally-supported tube provided with slots upon opposite sides, of a bar working within said tube provided with trunnions extending through said slots, a spring working against said bar to normally force the same outward, a stub-bar secured to said first-mentioned bar, said bar being provided with two stops and a supporting-pin, a keeper secured to said first-mentioned bar, a tilting lever secured to the end of said stub-bar and adapted to be engaged by said keeper, and means to actuate said keeper, as and for the purpose set forth.

Signed in the presence of two witnesses.

PHILIP K. YOUNG.

Witnesses:
GEORGE W. SUES,
R. J. DAVENPORT.